(12) United States Patent
Sawatzki et al.

(10) Patent No.: US 11,005,135 B2
(45) Date of Patent: May 11, 2021

(54) ELECTRIFIED VEHICLE WITH BATTERY ARRANGEMENT PERMITTING RELATIVE TRANSVERSE MOVEMENT OF INDIVIDUAL MODULES

(71) Applicant: Ford Global Technologies LLC, Dearborn, MI (US)

(72) Inventors: Marius Sawatzki, Pulheim (DE); Dominik Mueller, Euskirchen (DE); Daniel Meckenstock, Wuppertal (DE); Joergen Hilmann, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/359,215

(22) Filed: Mar. 20, 2019

(65) Prior Publication Data
US 2019/0312246 A1    Oct. 10, 2019

(30) Foreign Application Priority Data

Apr. 6, 2018   (DE) .......................... 102018205233.6

(51) Int. Cl.
*H01M 6/42*      (2006.01)
*H01M 2/10*      (2006.01)
(Continued)

(52) U.S. Cl.
CPC .............. *H01M 50/20* (2021.01); *B60K 1/04* (2013.01); *B62D 21/157* (2013.01); *B60K 2001/0438* (2013.01); *B60Y 2306/01* (2013.01)

(58) Field of Classification Search
None
See application file for complete search history.

(56) References Cited

U.S. PATENT DOCUMENTS

| | | | |
|---|---|---|---|
| 5,555,950 A | * | 9/1996 | Harada ..................... B60K 1/04 180/65.1 |
| 9,579,963 B2 | | 2/2017 | Landgraf |
| | | (Continued) | |

FOREIGN PATENT DOCUMENTS

| | | |
|---|---|---|
| DE | 102008059973 A1 | 6/2010 |
| DE | 102009052371 A1 | 6/2010 |
| | (Continued) | |

OTHER PUBLICATIONS

Kukreja, J. et al. "Crash Analysis of a Conceptual Electric Vehicle With a Damage Tolerant Battery Pack," Mechanics of Energy Materials, Extreme Mechanics Letter, vol. 9, Part 3, Dec. 2016, pp. 371-378. Downloaded from http://dx.doi.org/10.1016/j.eml.2016.05.004.

*Primary Examiner* — Cynthia H Kelly
*Assistant Examiner* — Julian Anthony
(74) *Attorney, Agent, or Firm* — David B. Kelley; Carlson, Gaskey & Olds, P.C.

(57) ABSTRACT

This disclosure relates to a battery arrangement for an electrified vehicle. Among other things, the battery arrangement includes first and second battery modules, each of which includes a battery module housing. Adjacent surfaces of these battery module housings are interlocked such that the first and second battery modules are configured to slide relative to one another in a transverse direction of the electrified vehicle. Accordingly, this disclosure increases safety while saving space and without requiring undue reinforcements of the chassis structure, which would increase the weight of the vehicle and reduce the energy efficiency the vehicle. These and other benefits will be appreciated from the following description.

18 Claims, 2 Drawing Sheets

(51) Int. Cl.
*H01M 2/24* (2006.01)
*H01M 50/20* (2021.01)
*B62D 21/15* (2006.01)
*B60K 1/04* (2019.01)

(56) References Cited

U.S. PATENT DOCUMENTS

| | | | |
|---|---|---|---|
| 2008/0160395 A1* | 7/2008 | Okada | H01M 2/1083 |
| | | | 429/99 |
| 2010/0178547 A1* | 7/2010 | Li | H01M 2/305 |
| | | | 429/151 |
| 2010/0273035 A1* | 10/2010 | Kim | H01G 9/14 |
| | | | 429/82 |
| 2015/0188115 A1* | 7/2015 | Pflueger | H01M 2/206 |
| | | | 429/158 |
| 2017/0029034 A1 | 2/2017 | Faruque et al. | |

FOREIGN PATENT DOCUMENTS

| | | |
|---|---|---|
| DE | 102009006991 A1 | 8/2010 |
| DE | 102010050826 A1 | 5/2012 |
| DE | 202016103720 U1 | 8/2016 |
| DE | 102016217934 A1 | 3/2018 |
| WO | 2013000548 A1 | 1/2013 |

* cited by examiner

ELECTRIFIED VEHICLE WITH BATTERY ARRANGEMENT PERMITTING RELATIVE TRANSVERSE MOVEMENT OF INDIVIDUAL MODULES

RELATED APPLICATION(S)

This application claims priority to German Patent Application No. 102018205233.6, filed on Apr. 6, 2018, the entirety of which is herein incorporated by reference.

TECHNICAL FIELD

This disclosure relates to a battery arrangement for an electrified vehicle. In particular, the battery arrangement includes modules which are configured to move relative to one another in a transverse direction.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction battery is a relatively high-voltage battery that selectively powers the electric machines, and potentially other electrical loads of the electrified vehicle. The traction battery can include battery arrays each including a plurality of interconnected battery cells that store energy.

Batteries for electrified vehicles are often mounted in a vehicle below the passenger compartment floor, where the battery is protected by various structures such as cross members and side sills, which are stabilizing side frame structures that lie approximately at the height of the subfloor. The central subfloor region forms a relatively safe zone for a battery in the event of an impact.

SUMMARY

A battery arrangement for an electrified vehicle according to an exemplary aspect of this disclosure includes, among other things, first and second battery modules, each of which includes a battery module housing. Further, adjacent surfaces of the battery module housings of the first and second battery modules are interlocked such that the first and second battery modules are configured to slide relative to one another in a transverse direction of the electrified vehicle.

In a further non-limiting embodiment of the foregoing battery arrangement, the adjacent surfaces are interlocked such that the first and second battery modules are prevented from moving relative to one another in both a longitudinal direction and a vertical direction.

In a further non-limiting embodiment of any of the foregoing battery arrangements, the adjacent surfaces include an aft surface of the battery module housing of the first battery module and a fore surface of the battery module housing of the second battery module.

In a further non-limiting embodiment of any of the foregoing battery arrangements, the fore surface of the battery module housing of the second battery module includes a T-shaped projection received in a correspondingly-shaped slot in the aft surface of the battery module housing of the first battery module.

In a further non-limiting embodiment of any of the foregoing battery arrangements, the first and second battery modules each have a length extending in the transverse direction.

In a further non-limiting embodiment of any of the foregoing battery arrangements, the adjacent surfaces each include an elongated hole extending in the transverse direction.

In a further non-limiting embodiment of any of the foregoing battery arrangements, the battery arrangement includes at least one flexible line extending between the first battery module and the second battery module by passing through the elongated holes.

In a further non-limiting embodiment of any of the foregoing battery arrangements, the at least one flexible line is configured to connect the first battery module to the second battery module either fluidly, mechanically, or electronically.

In a further non-limiting embodiment of any of the foregoing battery arrangements, the elongated holes are at least as long as a sum of a maximum relative displacement of the first and second battery modules and of a thickness of the at least one flexible line.

In a further non-limiting embodiment of any of the foregoing battery arrangements, the elongated holes are at least partially aligned with one another in a normal operating condition.

In a further non-limiting embodiment of any of the foregoing battery arrangements, the first and second battery module housings are mechanically connected together by at least one shear bolt configured to break upon application of a transverse force exceeding a predetermined amount.

In a further non-limiting embodiment of any of the foregoing battery arrangements, the first and second battery modules are arranged within a battery housing less rigid in the transverse direction than the first and second battery modules.

In a further non-limiting embodiment of any of the foregoing battery arrangements, the battery housing tapers in a front direction.

In a further non-limiting embodiment of any of the foregoing battery arrangements, the battery arrangement includes at least one additional battery module within the battery housing.

An electrified vehicle according to an exemplary aspect of the present disclosure includes, among other things, a battery arrangement positioned on or under a subfloor of the electrified vehicle. The battery arrangement includes first and second battery modules, each of which include a battery module housing. Further, adjacent surfaces of the battery module housings of the first and second battery modules are interlocked such that the first and second battery modules are configured to slide relative to one another in a transverse direction of the electrified vehicle.

In a further non-limiting embodiment of the foregoing electrified vehicle, the adjacent surfaces are interlocked such that the first and second battery modules are prevented from moving relative to one another in both a longitudinal direction and a vertical direction.

In a further non-limiting embodiment of any of the foregoing electrified vehicles, a fore surface of the battery module housing of the second battery module includes a T-shaped projection received in a correspondingly-shaped slot in an aft surface of the battery module housing of the first battery module.

In a further non-limiting embodiment of any of the foregoing electrified vehicles, the adjacent surfaces each include an elongated hole extending in the transverse direction, and the electrified vehicle further includes at least one flexible line extending between the first battery module and the second battery module by passing through the elongated holes.

In a further non-limiting embodiment of any of the foregoing electrified vehicles, the electrified vehicle includes stops configured to limit a maximum relative displacement of the first and second battery module housings.

In a further non-limiting embodiment of any of the foregoing electrified vehicles, the first and second battery modules are arranged within a battery housing less rigid in the transverse direction than the first and second battery modules.

DETAILED DESCRIPTION

Figure 1:
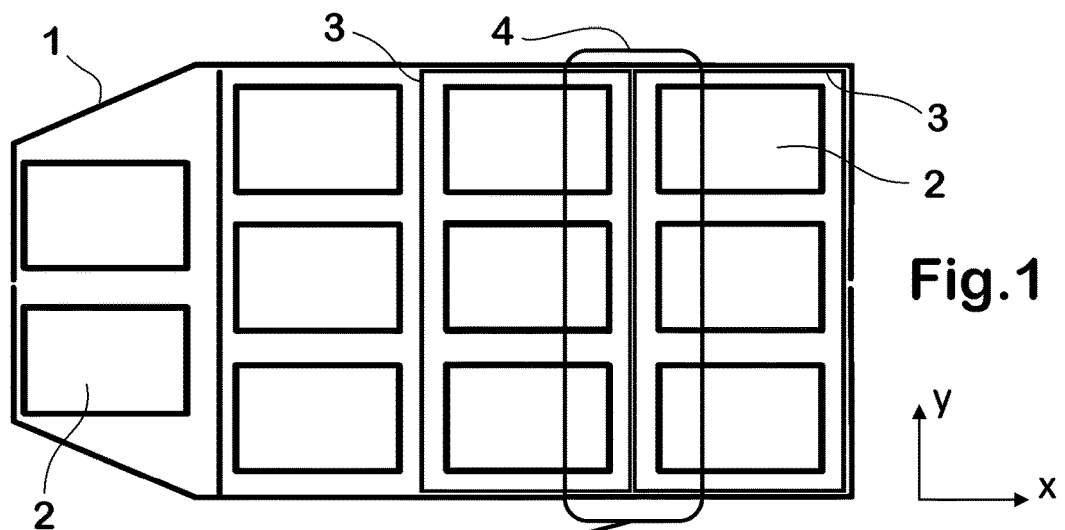
FIG. 1 schematically illustrates an example battery arrangement from a top view.

This disclosure relates to a battery arrangement for an electrified vehicle. In particular, the battery arrangement includes modules which are configured to move relative to one another in a transverse direction. For instance, an example battery arrangement includes first and second battery modules, each of which includes a battery module housing. Adjacent surfaces of these battery module housings are interlocked such that the first and second battery modules are configured to slide relative to one another in a transverse direction of the electrified vehicle. Accordingly, this disclosure increases safety, especially in the context of a side impact, while saving space and without requiring undue reinforcements of the vehicle chassis structure, which would increase the weight of the vehicle and reduce the energy efficiency the vehicle. These and other benefits will be appreciated from the following description.

This disclosure relates to a battery arrangement for an electrified vehicle having a plurality of battery modules that each include battery module housings. The battery module housings enclose a plurality of battery cells. The battery module housings are connected to one another by flexible lines, such as cables. Further, the battery module housings are arranged such that their length dimension extends in the transverse direction (i.e., side-to-side direction) of the vehicle, and such that they are arranged one-behind-the-other relative to the longitudinal direction of the vehicle. Further still, the battery module housings and are all surrounded by a common battery housing. The battery module housings are movable relative to one another in the transverse direction in response to an impact force.

In an aspect of this disclosure, mutually facing surfaces of adjacent battery module housings engage one another in an interlocking manner. In particular, when viewed in the transverse direction, an aft surface of a first battery module housing interlocks with a fore surface of a second battery module housing. This ensures, on the one hand, that the battery module housings move relative to one another without requiring separate guiding elements, which take up space and add weight and cost. On the other hand, this provides the individual battery module housings with rigidity in the transverse direction of the vehicle while using a relatively small amount of material. Rigidity in the transverse direction enables the battery modules to transmit the force of a side impact to the opposite side of the vehicle, thereby effectively distributing and absorbing the impact force.

In a further aspect of this disclosure, the mutually facing surfaces of the adjacent battery module housings include complementary, interlocking sliding surfaces. The mutually facing surfaces, and in turn the adjacent battery modules, are configured to move relative to one another in the transverse direction. Further, the interlocking connection prevents relative vertical and longitudinal movement of the adjacent battery modules.

In a further aspect of this disclosure, the mutually facing surfaces of the battery module housings comprise elongated holes that are aligned with one another during normal operating conditions. Flexible lines pass through the elongated holes to connect adjacent battery modules to one another. This renders it possible to be able to keep the flexible connecting lines, which may be power cables and/or coolant pipes, relatively short in length, and in addition accommodate said lines in a space-saving and well-protected manner.

In yet another aspect of this disclosure, the battery module housings are more rigid in the transverse direction of the vehicle than the common battery housing. Further, the battery module housings are generally cuboid in shape, with the exception of the interlocking structures.

The battery arrangement described herein may be mounted on or under a subfloor of an electrified vehicle. In particular, the battery arrangement may be mounted between the transverse-extending vehicle axles and between the longitudinally-extending side sills. The subfloor region is naturally suited to protect the battery arrangement from front and rear impacts. Further, this disclosure particularly increases the ability of the battery arrangement to withstand side impacts. Accordingly, the battery arrangement increases safety relative to all types of impacts.

FIG. 1 illustrates a battery housing 1 that is arranged on or under a subfloor of an electrified vehicle between the transverse-extending front and rear axles and the longitudinally-extending side sills. For reference, the transverse and longitudinal directions are the "y" and "x" directions, respectively, in FIG. 1.

The battery housing 1 comprises multiple battery modules, each of which encloses battery cells 2, which may be individual cells or arrays of cells. The battery housing 1 tapers toward the vehicle front in this example. In the example of FIG. 1, the two rearmost battery modules (relative to the longitudinal direction x) include individual battery module housings 3. The two front battery modules may also include individual module housings or be provided in the same housing. While a particular number of battery cells 2 and battery module housings 3 are shown in FIG. 1, it should be understood that this disclosure extends to different arrangements including a different number or configuration of the battery cells 2 and battery module housings 3.

The battery module housings 3 are arranged such that their length dimensions are arranged in the transverse direction y. The battery module housings 3 are also arranged one-behind-the-other relative to the longitudinal direction x. Further, the battery module housings 3 are within the battery housing 1, which effectively serves as a common outer case for all of the battery module housings 3. The battery module housings 3 are more rigid in the transverse direction y than the surrounding battery housing 1, as will be appreciated from the below.

The battery module housings 3 are configured to move relative to one another in the transverse direction y in response to a side impact. During normal operating conditions, however, the battery module housings 3 may be connected to one another and/or to the battery housing 1 by a mechanical connection that is configured to break when a predetermined force is exceeded. In particular, the battery module housings 3 may be connected with shear bolts, configured to hold the battery module housings 3 during normal conditions, but configured to break and permit relative transverse movement of the battery module housings 3 when a side impact force exceeds a predetermined force.

Figure 2:
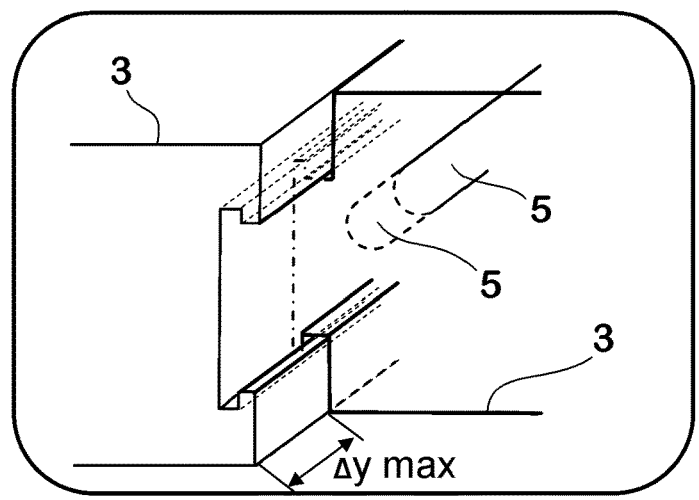
FIG. 2 is a partial perspective view of two adjacent battery modules of the arrangement of FIG. 1.

In this disclosure, the battery module housings 3 are only configured to move relative to one another in one direction, which in this example is the transverse direction y. The battery module housings 3 are connected together in a way that prevents relative movement in the longitudinal direction x or a vertical direction (i.e., in-and-out of the page, relative to FIG. 1). FIG. 2 illustrates an example interlocking connection between adjacent battery module housings 3.

As shown in FIG. 2, the mutually facing, adjacent surfaces of the battery module housings 3 are configured as interlocking sliding surfaces. In this example, a fore surface of the housing of an aft battery module includes a projection, which is T-shaped, and which projects in a forward direction such that it is received in a correspondingly-shaped slot formed in an aft surface of the housing of a fore battery module. The interlocking sliding surfaces facilitate relative displacement of the battery module housings 3 without the battery module housings 3 becoming jammed or stuck. The maximum possible relative displacement of the battery module housings 3 may limited by stops, not illustrated, or the side sills of the electrified vehicle to an amount Δy max.

Further, as illustrated in FIG. 2, the mutually facing surfaces of the battery module housings 3 comprise elongated holes 5 that extend in the transverse direction y at least over a length that corresponds to the sum of Δy max and of the thickness of the flexible lines 6. In one example, the elongated holes are of equal length. In normal conditions, when the battery housing 1 is not deformed and the battery module housings 3 are not displaced relative to one another, adjacent elongated holes 5 are at least partially aligned with one another. In a particular example, the adjacent elongated holes 5 are fully aligned with one another over their entire length in normal conditions.

Figure 3:
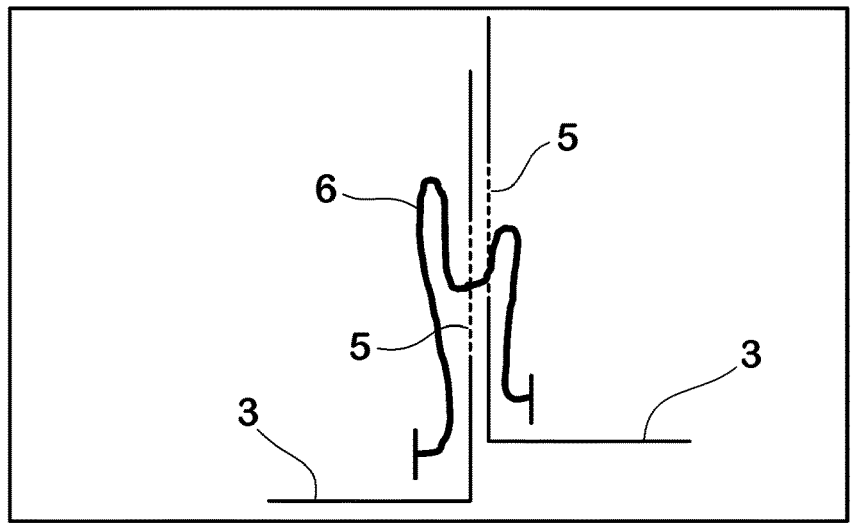
FIG. 3 is a schematic view of two adjacent battery module housings.

FIG. 3 is a schematic view illustrating how two adjacent battery module housings 3 are connected to one another by means of flexible lines 6. The flexible lines 6 may be high voltage power cables and/or coolant pipes mechanically, fluidly, and/or electrically connecting the adjacent battery module housings 3. The flexible lines 6 pass through the elongated holes 5 and have an overall length that corresponds to or is slightly greater than Δy max. Thus, the flexible lines 6 will not break if the battery module housings 3 are displaced relative to one another.

Figure 4:
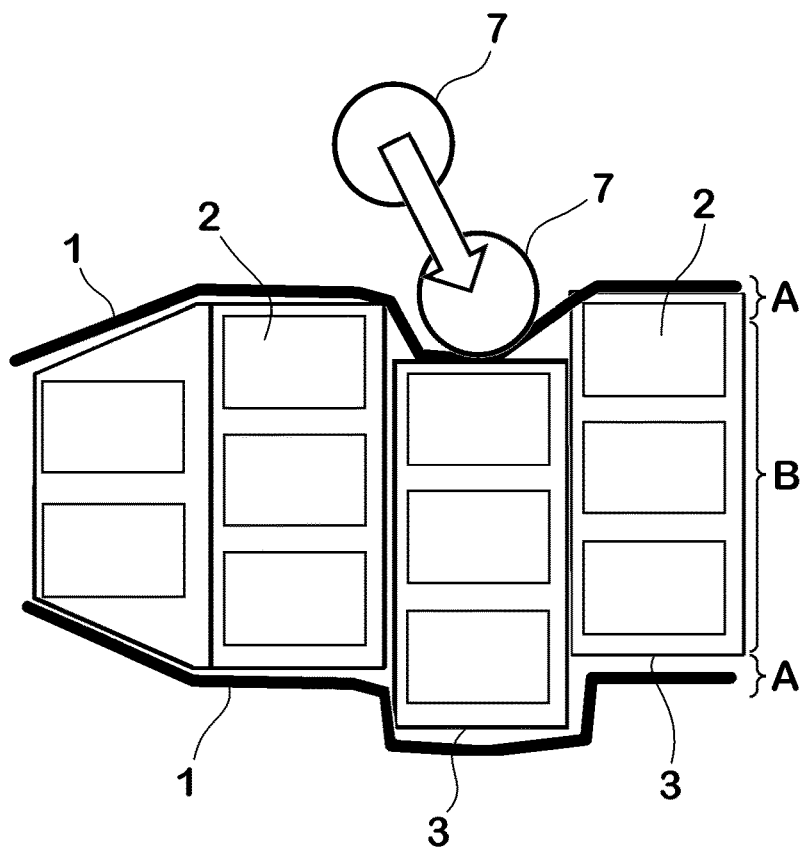
FIG. 4 schematically illustrates the example battery arrangement from a top view, and is representative of a condition in which the battery arrangement has been deformed by a first example side impact.
Figure 5:
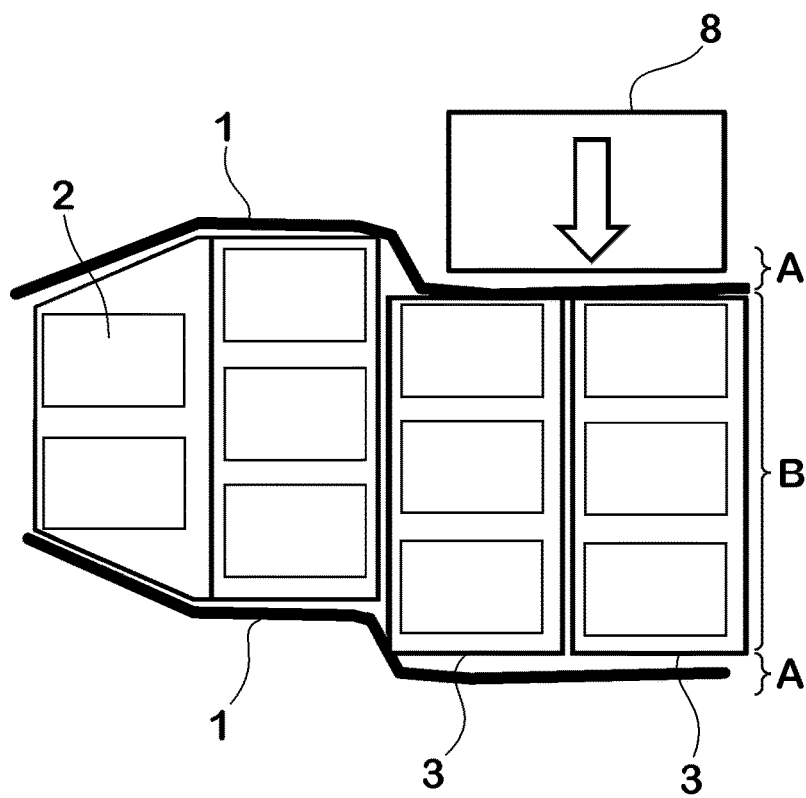
FIG. 5 schematically illustrates the example battery arrangement from a top view, and is representative of a condition in which the battery arrangement has been deformed by a second example side impact.

Relative transverse displacements of the battery module housing 3 may occur in particular in the event of a side impact. Two example side impact situations that are represented in FIGS. 4 and 5. FIG. 4 is representative of a side impact with an object such as a pole, represented by cylindrical impact body 7. FIG. 5 is representative of a side impact with a vehicle, for example, as represented by cuboid body 8.

With reference to FIGS. 4 and 5, the disclosed battery arrangement permits those battery module housings 3 subjected to an impact force to move relative to the others in the transverse direction y. Since the battery housing 1 is less rigid in the transverse direction y, the impact force is transmitted through the battery housing 1 to only the battery module housings 3 adjacent the location of the impact. The affected battery module housings 3 transmit impact energy to an opposite side of the vehicle. In this manner, almost the same amount of impact energy is distributed and absorbed on both sides of the battery arrangement, namely approximately in the zones A marked in FIGS. 4 and 5. On the other hand, the battery arrangement is essentially incompressible in the middle zone B.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery arrangement for an electrified vehicle, comprising:
    first and second battery modules each including a battery module housing, wherein adjacent surfaces of the battery module housings of the first and second battery modules are interlocked such that the first and second battery modules are configured to slide relative to one another in a transverse direction of the electrified vehicle, wherein the adjacent surfaces are interlocked such that the first and second battery modules are prevented from moving relative to one another in both a longitudinal direction and a vertical direction.

2. The battery arrangement as recited in claim 1, wherein the adjacent surfaces include an aft surface of the battery module housing of the first battery module and a fore surface of the battery module housing of the second battery module.

3. The battery arrangement as recited in claim 2, wherein the fore surface of the battery module housing of the second battery module includes a T-shaped projection received in a correspondingly-shaped slot in the aft surface of the battery module housing of the first battery module.

4. The battery arrangement as recited in claim 1, wherein the first and second battery modules each have a length extending in the transverse direction.

5. The battery arrangement as recited in claim 1, wherein the adjacent surfaces each include an elongated hole extending in the transverse direction.

6. The battery arrangement as recited in claim 5, further comprising at least one flexible line extending between the first battery module and the second battery module by passing through the elongated holes.

7. The battery arrangement as recited in claim 6, wherein the at least one flexible line is configured to connect the first battery module to the second battery module either fluidly, mechanically, or electronically.

8. The battery arrangement as recited in claim 6, wherein the elongated holes are at least as long as a sum of a maximum relative displacement of the first and second battery modules and of a thickness of the at least one flexible line.

9. The battery arrangement as recited in claim 5, wherein the elongated holes are at least partially aligned with one another in a normal operating condition.

10. The battery arrangement as recited in claim 1, wherein the first and second battery module housings are mechanically connected together by at least one shear bolt configured to break upon application of a force exceeding a predetermined amount.

11. A battery arrangement for an electrified vehicle, comprising:
first and second battery modules each including a battery module housing, wherein adjacent surfaces of the battery module housings of the first and second battery modules are interlocked such that the first and second battery modules are configured to slide relative to one another in a transverse direction of the electrified vehicle, and wherein the first and second battery modules are arranged within a battery housing less rigid in the transverse direction than the first and second battery modules.

12. The battery arrangement as recited in claim 11, wherein the battery housing tapers in a front direction.

13. The battery arrangement as recited in claim 11, wherein the battery arrangement includes at least one additional battery module within the battery housing.

14. An electrified vehicle, comprising:
a battery arrangement positioned on or under a subfloor of the electrified vehicle, the battery arrangement having first and second battery modules each including a battery module housing, wherein adjacent surfaces of the battery module housings of the first and second battery modules are interlocked such that the first and second battery modules are configured to slide relative to one another in a transverse direction of the electrified vehicle, wherein the adjacent surfaces are interlocked such that the first and second battery modules are prevented from moving relative to one another in both a longitudinal direction and a vertical direction.

15. The electrified vehicle as recited in claim 14, wherein a fore surface of the battery module housing of the second battery module includes a T-shaped projection received in a correspondingly-shaped slot in an aft surface of the battery module housing of the first battery module.

16. The electrified vehicle as recited in claim 14, wherein the adjacent surfaces each include an elongated hole extending in the transverse direction, and further comprising at least one flexible line extending between the first battery module and the second battery module by passing through the elongated holes.

17. The electrified vehicle as recited in claim 14, further comprising stops configured to limit a maximum relative displacement of the first and second battery module housings.

18. The electrified vehicle as recited in claim 14, wherein the first and second battery modules are arranged within a battery housing less rigid in the transverse direction than the first and second battery modules.

\* \* \* \* \*